April 21, 1970    H. RUHLE ET AL    3,507,196
PHOTOGRAPHIC CAMERA WITH FLASH UNIT
Filed Feb. 8, 1967    2 Sheets-Sheet 1

United States Patent Office 3,507,196
Patented Apr. 21, 1970

3,507,196
PHOTOGRAPHIC CAMERA WITH FLASH UNIT
Hans Ruhle and Josef Schwahn, Stuttgart, Germany, assignors to Zeiss Ikon Aktiengesellschaft, Stuttgart, Germany, a corporation of Germany
Filed Feb. 8, 1967, Ser. No. 614,744
Claims priority, application Germany, Feb. 19, 1966, Z 12,042
Int. Cl. G03b 9/70
U.S. Cl. 95—11.5         6 Claims

ABSTRACT OF THE DISCLOSURE

A photographic camera having an adjustable shutter, a flash unit for the camera, and an electrical circuit for controlling the speed of the shutter in response to operation of the flash unit. The electrical circuit for the flash unit includes a battery, a capacitor, a flash bulb, and a switch for actuating the flash bulb and producing an ignition current. The shutter speed is controlled by a separate electrical circuit consisting of an electromagnet and a transistor which is connected in parallel with the flash circuit and is activated by the ignition current produced in the flash circuit.

---

The invention relates to a photographic camera equipped with a built-in or an attachable flash unit and with a device for automatically adjusting the shutter speed required for a flash exposure.

It is known that in order to benefit fully from the light stream produced by the flash for a photographic exposure the shutter must be kept open a certain minimum time, for instance 1/30 sec. Such a long exposure time is rarely necessary for daylight exposures and is moreover undesirable because already minor moves of the object may lead to a blurred picture. For daylight exposures the light value measured is employed which requires at a relatively fast shutter speed a predetermined diaphragm aperture value. In order to have the shutter speed for flash exposures automatically adjusted in relation to the operations of the flash unit, it has been proposed heretofore to synchronize the adjustment of the exposure time ring on the shutter or of other control elements within the shutter with the attachment of the flash unit to the camera or with the transference of certain parts required for flash exposure, e.g. the reflector, into their operative position. This requires, however, a number of more or less complex control means.

The present invention has solved the problem of an automatic formation of the shutter speed in flash exposures in a way which is basically different from the mechanically controlled shutter speed formation employed heretofore.

According to the invention, the ignition current of the flash unit or the discharge current of the condenser associated with the flashbulb, respectively, is used to control means when flashing a flashbulb which cause the shutter to form the correct speed required by the flash unit or the flashbulb, respectively.

The means controlled by the ignition current of the flash unit have the purpose to extend the running time of the shutter or retard its closing, respectively.

Additional means may be provided for extending the running time of the shutter beyond the flash duration of the bulb.

This control of the shutter by way of the ignition current is achieved in that a magnet controlled by the ignition current acts on a disc rotatably associated with the shutter or on the shutter disc itself.

Another way of controlling the shutter is by means of an eddy-current brake which for the purpose of forming the desired shutter speed acts on the shutter disc or on a rotary disc coupled with the shutter drive.

It is also possible to provide an electromagnet powered by the ignition current, whereby the electromagnet armature exerts a retarding or locking effect on the shutter drive mechanism.

If purely electromagnetic or electronic shutters are used, then the ignition current of the flash unit will energize the electric means which form the shutter speed, such as condensers, transistors or the like, and this is accomplished in that resistances, R-C members or the like present in the electric circuit are controlled by additional electronic control means to be introduced in the circuit.

To obtain any predetermined shutter speed it is expedient to control the ignition current itself, or at least an auxiliary current required for the control of the shutter and being in a selectable ratio to the ignition current, by the use of variable ohmic, capacitative or inductive resistances.

As a source of current for the control of the shutter serves either the battery of the flash unit or a second battery provided independently from the first one.

The invention will be described in further detail with reference to the accompanying drawing in which FIG. 1 illustrates a circuit diagram of a flash unit associated with a camera;

FIG. 2 diagrammatically illustrates a photographic camera combined with a flash unit in accordance with the present invention;

Figure 1:
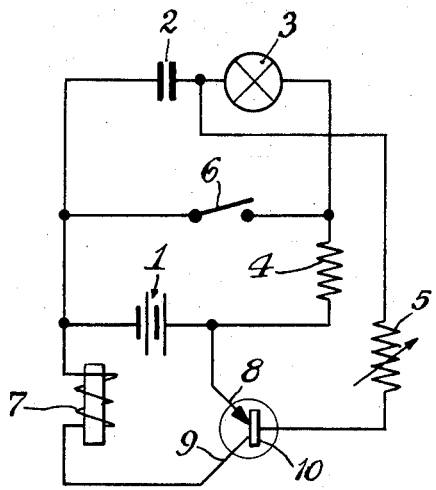

Referring to FIG. 1, the circuit of a flash unit comprises substantially a battery 1 which charges the capacitor 2 by way of the flashbulb 3 with 4 and 5 being designated a protective resistance and a variable resistance, respectively. By closing the switch 6 the condenser 2 is discharged and causes the flashbulb to ignite.

Parallel to the battery 1 and in series to each other are connected an electromagnet 7 and a transistor, the latter in such a manner that its emitter 8 and its collector 9 permit a flow of current when the base 10 is energized by the working voltage. This takes place when the bulb 3 is flashed. Then the electromagnet 7 is energized and controls in the desired manner a member, such as a retarding mechanism, which controls the speed of the shutter. In place of the electromagnet may also be used an eddy-current brake which acts in such a manner on a rotary shutter element, such as 12 in FIG. 2, that the desired shutter speed is formed.

Figure 2:
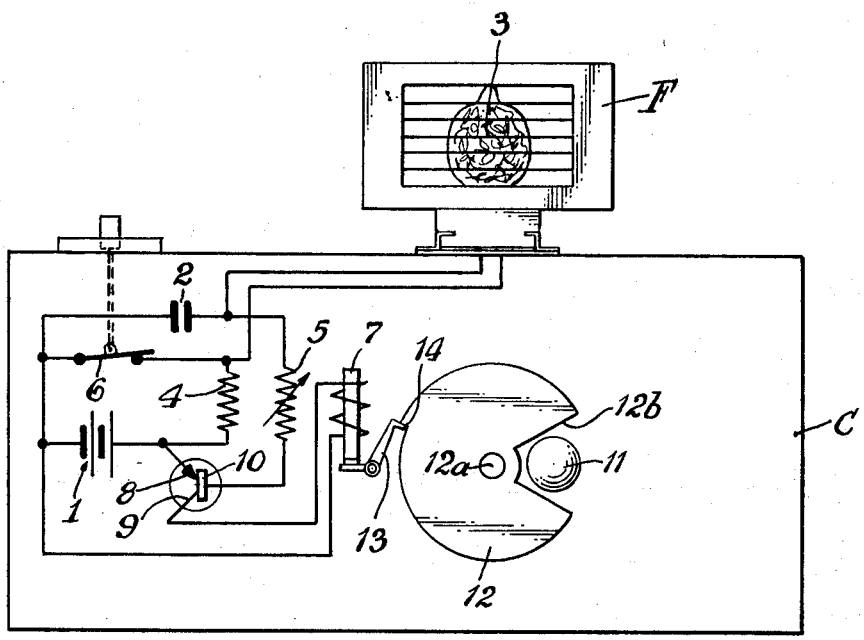

FIG. 2 illustrates diagrammatically a photographic camera C with a flash unit F attached thereto. In rear of the camera objective 11 is arranged a shutter disc 12 rotatable about an axis 12a arranged spaced from but parallel to the optical axis of the objective 11. The camera shutter comprises a substantially circular so-called single disc shutter provided with a radial recess 12b which when in alignment with the camera objective 11 permits an exposure of the film. The shutter disc 12 is provided at its circumference with a radial shoulder 14 which in the open position of the shutter disc 12 engages one end of an angular lever 13 the other end of which is arranged next to one end of the armature of the electromagnet 7 which activates the lever 13.

Figure 3:
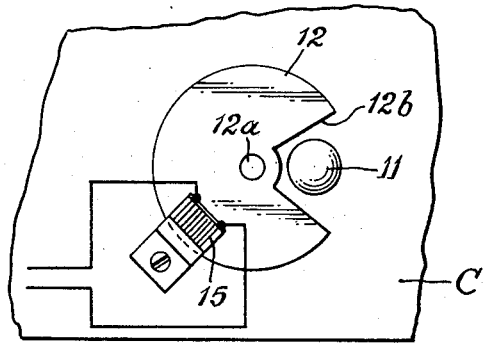
FIG. 3 illustrates a modified arrangement of the circuit.

In place of the electromagnet 7 may be employed in eddy-current brake 15 as illustrated in FIG. 3.

Figure 4:
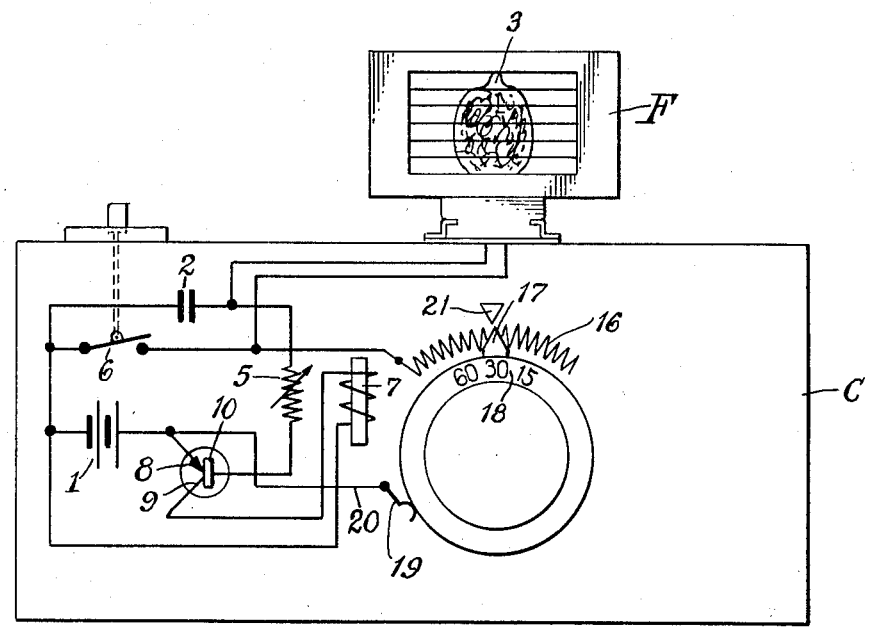
FIG. 4 illustrate a further modified arrangement of the invention.

FIG. 4 illustrates a modified arrangement in which the fixed resistance 4 is replaced by a variable resistance 16 along which a different resistance value is adjusted by means of a slidable contact 17 fixed to a rotatable ring 18 carrying a shutter speed scale cooperating with a fixed index 21. The slidable contact 17 is electrically connected with the slidable contact 19 in a manner not illustrated and the contact 19 in turn is connected by a conductor 20 with the emitter 8 of the transistor to complete the circuit. A variable resistance 16 and the slidable contact 17 are arranged within the camera and are not visible from the outside.

What we claim is:

1. In a photographic camera provided with an adjustable shutter and a flash unit, circuit means including a battery, a capacitor, a flash bulb and a switch which upon closing causes said capacitor to discharge and produce an ignition current which ignites said flash bulb, another circuit means parallel to said battery and including an electromagnet and a transistor and means energizing the same by said ignition current when said flash bulb is ignited, and means operated by said energized electromagnet for controlling and adjusting the speed of said shutter.

2. A camera arrangement according to claim 1, in which said means controlled by said electromagnet retards the operation of said shutter.

3. A camera arrangement according to claim 1, in which said means controlled by the electromagnet delays the closing of the opened shutter.

4. A camera arrangement according to claim 1, in which said means operated by said electromagnet is acting upon a rotary shutter disc operating in synchronism with said shutter.

5. A camera arrangement according to claim 1, including an eddy-current brake controlled by said electromagnet, said eddy-current brake acting upon said shutter comprising a rotary shutter disc.

6. A camera arrangement according to claim 1, in which said electromagnet has an armature which exerts a delaying influence upon the operation of said shutter.

References Cited

UNITED STATES PATENTS

| | | | |
|---|---|---|---|
| 3,063,354 | 11/1962 | Matulik et al. | 95—10 |
| 3,191,516 | 6/1965 | Corcoran | 95—59 |
| 3,294,002 | 12/1966 | Vitkine | 95—11.5 |
| 3,380,358 | 4/1968 | Neumann | 95—11.5 |

NORTON ANSHER, Primary Examiner

FRED L. BRAUN, Assistant Examiner

U.S. Cl. X.R.

95—53